(12) United States Patent
Kim et al.

(10) Patent No.: US 12,094,436 B2
(45) Date of Patent: Sep. 17, 2024

(54) CONTROL CIRCUIT, DISPLAY DEVICE, AND METHOD FOR DRIVING MAIN PROCESSOR

(71) Applicant: LG Display Co., Ltd., Seoul (KR)

(72) Inventors: Jogtaek Kim, Paju-si (KR); Nakyoon Kim, Paju-si (KR); Hogeun Koo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/065,610

(22) Filed: Dec. 13, 2022

(65) Prior Publication Data

US 2023/0215401 A1 Jul. 6, 2023

(30) Foreign Application Priority Data

Dec. 30, 2021 (KR) .......................... 10-2021-0193481

(51) Int. Cl.
*G09G 5/00* (2006.01)

(52) U.S. Cl.
CPC ....... *G09G 5/008* (2013.01); *G09G 2310/061* (2013.01); *G09G 2330/021* (2013.01); *G09G 2370/10* (2013.01)

(58) Field of Classification Search
CPC ............. G09G 5/008; G09G 2310/061; G09G 2330/021; G09G 2370/10; G09G 3/20; G09G 3/2074; G09G 3/3208; G09G 2300/0857; G09G 2310/08; G09G 2370/045; Y02D 10/00
See application file for complete search history.

(56) References Cited

U.S. PATENT DOCUMENTS

| | | | |
|---|---|---|---|
| 10,354,587 B2 * | 7/2019 | Kim | G09G 3/3258 |
| 2015/0255042 A1 * | 9/2015 | Oh | G09G 3/20 345/212 |
| 2018/0204502 A1 * | 7/2018 | Sung | G09G 3/2092 |
| 2019/0172412 A1 * | 6/2019 | Kim | G09G 5/006 |
| 2020/0193884 A1 * | 6/2020 | Kim | G09G 5/008 |
| 2021/0067310 A1 * | 3/2021 | Lim | H04L 7/0004 |
| 2021/0280110 A1 * | 9/2021 | Kim | G09G 3/2096 |
| 2022/0028320 A1 * | 1/2022 | Kim | G09G 5/12 |
| 2022/0231829 A1 * | 7/2022 | Park | H03L 7/0802 |

* cited by examiner

*Primary Examiner* — Bryan Earles
(74) *Attorney, Agent, or Firm* — Seed IP Law Group LLP

(57) ABSTRACT

Embodiments of the disclosure relate to a control circuit, a display device, and a method for driving a main processor. Specifically, there may be provided a control circuit, a display device, and a method for driving a main processor which may reduce power consumption in the transmission/reception circuit connected with the interface by powering off at least one of the source transmission/reception circuit or sink transmission/reception circuit electrically connected with the auxiliary channel AUX during at least a partial period of the vertical blank period.

22 Claims, 13 Drawing Sheets

FIG.10

| COUNT | OUTPUTS | | | |
|---|---|---|---|---|
| | Q0 | Q1 | Q2 | Q3 |
| 0 | L | L | L | L |
| 1 | L | L | L | H |
| 2 | L | L | H | L |
| 3 | L | L | H | H |
| 4 | L | H | L | L |
| 5 | L | H | L | H |
| 6 | L | H | H | L |
| 7 | L | H | H | H |
| 8 | H | L | L | L |
| 9 | H | L | L | H |
| 10 | H | L | H | L |
| 11 | H | L | H | H |
| 12 | H | H | L | L |
| 13 | H | H | L | H |
| 14 | H | H | H | L |
| 15 | H | H | H | H |

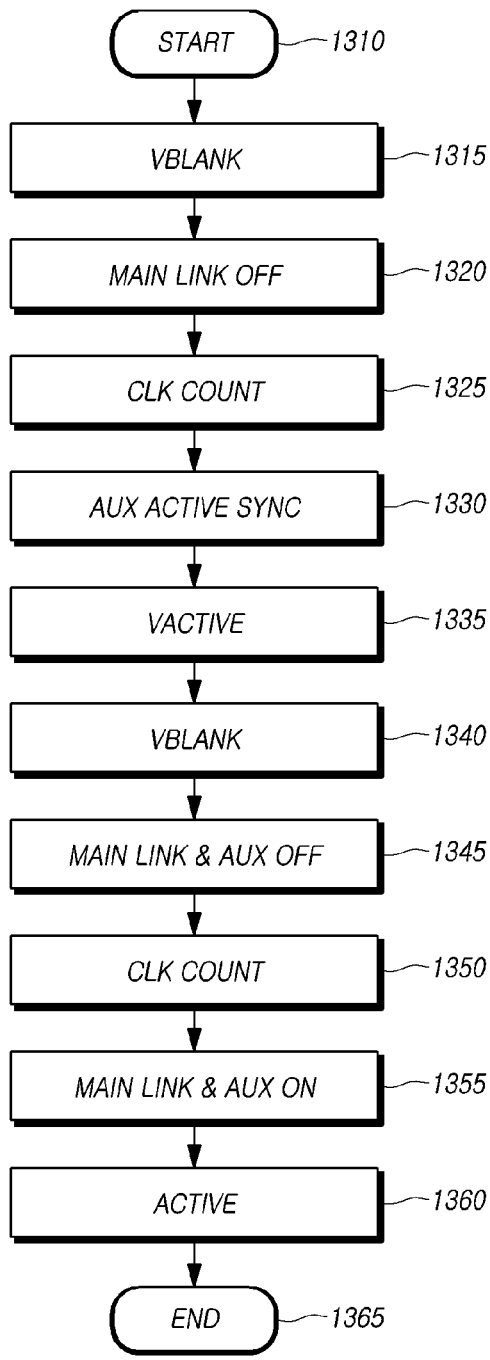

CONTROL CIRCUIT, DISPLAY DEVICE, AND METHOD FOR DRIVING MAIN PROCESSOR

CROSS-REFERENCE TO RELATED APPLICATION

This application claims priority from Korean Patent Application No. 10-2021-0193481, filed on Dec. 30, 2021, which is hereby incorporated by reference for all purposes as if fully set forth herein.

BACKGROUND

Technical Field

Embodiments of the disclosure relate to a control circuit, a display device, and a method for driving a main processor.

Description of the Related Art

The growth of intelligence society leads to various needs for displays and wide use of various forms of display devices, such as liquid crystal displays (LCDs), plasma display panels (PDPs), or organic light emitting displays (OLEDs).

The display device may include a display driving circuit for generating and outputting voltages for displaying images and a timing controller for controlling the operation timing of the display driving circuit.

The timing controller may be connected to a main processor via a preset or selected interface. The main processor and the timing controller may transmit or receive commands and data according to a preset or selected interface standard.

BRIEF SUMMARY

Embodiments of the disclosure may provide a control circuit, a display device, and a method for driving a main processor capable of reducing power consumed in a transmission/reception circuit connected with an interface.

Embodiments of the disclosure may provide a control circuit comprising a main processor including a source transmission/reception circuit and a timing controller including a sync transmission/reception circuit connected with the main processor through an interface, the timing controller generating and outputting image data and a control signal, wherein the interface includes a main link and an auxiliary channel, and wherein the main processor powers off at least one of the source transmission/reception circuit or the sink transmission/reception circuit electrically connected with the auxiliary channel during at least a partial period of a vertical blank period between different refresh frame periods.

Embodiments of the disclosure may provide a display device comprising a main processor including a source transmission/reception circuit, a timing controller including a sink transmission/reception circuit connected with the main processor through an interface, the timing controller generating and outputting image data and a control signal, a data driving circuit controlled for driving timing by the timing controller and generating and outputting a data voltage based on the image data and the control signal, a gate driving circuit controlled by the timing controller and outputting a gate voltage based on the control signal, and a display panel having a plurality of data lines to which the data voltage is applied, a plurality of gate lines to which the gate voltage is applied, and a plurality of subpixels electrically connected to the plurality of data lines and the plurality of gate lines, wherein the interface includes a main link and an auxiliary channel, and wherein the main processor powers off at least one of the source transmission/reception circuit or the sync transmission/reception circuit electrically connected with the auxiliary channel during at least a partial period of a vertical blank period between different refresh frame periods.

Embodiments of the disclosure may provide a method for driving a main processor, comprising transmitting a pixel packet for generating image data to a timing controller through a main link of an interface, by the main processor, powering off a source transmission/reception circuit electrically connected with an auxiliary channel of the interface after the timing controller receives the pixel packet, by the main processor including the source transmission/reception circuit, powering on the source transmission/reception circuit electrically connected with the auxiliary channel, by the main processor, and transmitting a link training signal through the main link, by the main processor.

Embodiments of the disclosure may provide a control circuit, comprising: a main processor including a source transmission/reception circuit; and a timing controller including a sink transmission/reception circuit connected with the main processor through an interface, the timing controller generating and outputting image data and a control signal, wherein the interface includes a main link and an auxiliary channel, and wherein the main processor powers off at least one of the source transmission/reception circuit and the sink transmission/reception circuit electrically connected with the main link during at least a partial period of a vertical blank period between different refresh frame periods According to embodiments of the disclosure, there may be provided a control circuit, a display device, and a method for driving a main processor capable of reducing power consumed in a transmission/reception circuit connected with an interface.

BRIEF DESCRIPTION OF THE SEVERAL VIEWS OF THE DRAWINGS

The above and other technical benefits, features, and advantages of the present disclosure will be more clearly understood from the following detailed description, taken in conjunction with the accompanying drawings, in which:

FIGS. 8 to 10 are views exemplarily illustrating an embodiment and operation method of a counter;

FIGS. 12 and 13 are flowcharts illustrating a method for driving a main processor according to embodiments of the disclosure.

DETAILED DESCRIPTION

Figure 1:
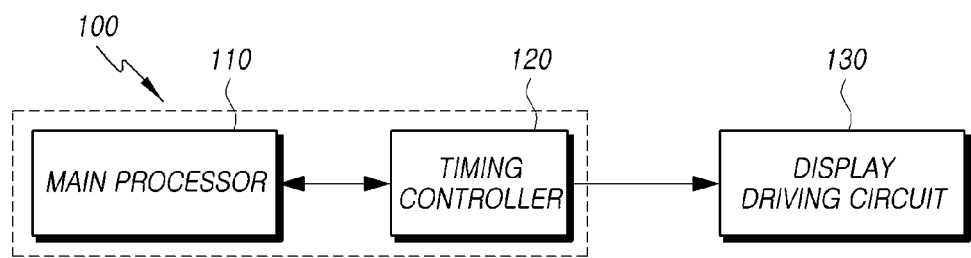
FIG. 1 is a block diagram illustrating a control circuit and a data driving circuit controlled by the control circuit according to embodiments of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure are described in detail with reference to the accompanying drawings.

FIG. 1 is a block diagram illustrating a control circuit 100 and a display driving circuit 130 controlled by the control circuit 100 according to embodiments of the disclosure.

Referring to FIG. 1, the control circuit 100 according to embodiments of the disclosure includes a main processor 110 and a timing controller 120 configured to generate and output a data voltage for image display.

The main processor 110 and the timing controller 120 may send and receive converted commands and signals according to a preset or selected interface standard.

The timing controller 120 controls the display driving circuit 130 and functions to allow the display driving circuit 130 to output signals (e.g., data voltage, gate voltage, etc.) for image display to the display panel according to timings.

Figure 2:
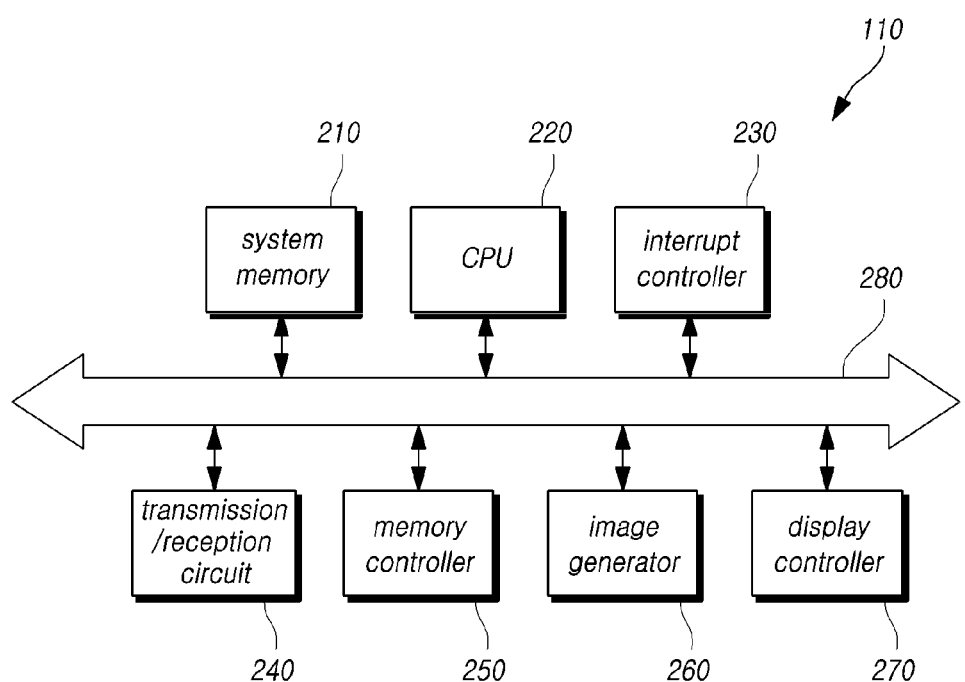
FIG. 2 is a block diagram illustrating a configuration of a main processor according to embodiments of the disclosure.

FIG. 2 is a block diagram illustrating a configuration of a main processor 110 according to embodiments of the disclosure.

Referring to FIG. 2, the main processor 110 according to embodiments of the disclosure may include a system memory 210, a central processing unit (CPU) or central processor 220, an interrupt controller 230, a transmission/reception circuit 240, a memory controller 250, an image generator 260, and a display controller 270.

The system memory 210 may store commands and parameters beneficial for the operation of the above-described display driving circuit 130. For example, the CPU 220 may be operated using the commands and parameters stored in the system memory 210.

The CPU 220 may control the overall operation of the main processor 110. For example, the CPU 220 may control the operation of each component, i.e., the system memory 210, the interrupt controller 230, the transmission/reception circuit 240, the memory controller 250, the image generator 260, and the display controller 270. The CPU 220 may request the image generator 260 to generate or process an image.

The interrupt controller 230 may control interrupts caused during the operation of the main processor 110. In other words, the interrupt controller 230 may receive interrupts from each component and adjust the execution order of each interrupt and transfers it to the CPU 220 to perform an operation corresponding to the corresponding interrupt.

The transmission/reception circuit 240 may transmit/receive commands, signals, interrupts, and data converted according to various interface standards to and from the above-described timing controller 120. The transmission/reception circuit 240 may provide image data stored in an external memory (not shown) to the display driving circuit 130 (particularly, a data driving circuit) through the timing controller 120. In the disclosure, the transmission/reception circuit 240 may mean only a transmission circuit including a configuration for transmitting data or may mean only a reception circuit including a configuration for receiving data, or may also mean a transmission/reception circuit including a configuration for transmitting and receiving data.

The memory controller 250 may control the external memory when transmitting and receiving data from the external memory connected to the main processor 110. In other words, the memory controller 250 may access the external memory according to a request from the CPU 220, the image generator 260, or the display controller 270 to read, write, and delete image data. The image generator 260 may generate or process program commands related to graphic processing under the control of the CPU 220. The image generator 260 may be implemented as a graphic engine, a graphic processing unit (GPU) or graphics processor, a graphic accelerator, or 2D.

The display controller 270 may control the operation of the main processor 110 on the above-described timing controller 120 or may control the operation of the timing controller 120 on the main processor 110. For example, the display controller 270 may control the memory controller 250 to output data stored in the external memory through the transmission/reception circuit 240. The display controller 270 may control the image generator 260 to output image data generated by the image generator 260 through the transmission/reception circuit 240.

The system bus 280 may serve as a path for data transmission/reception between the components by connecting the components of the main processor 110. The system bus 280 may include a small bus for data communication between components.

The main processor 110 according to embodiments of the disclosure may be a host system or a system-on-chip (SoC) device.

Figure 3:
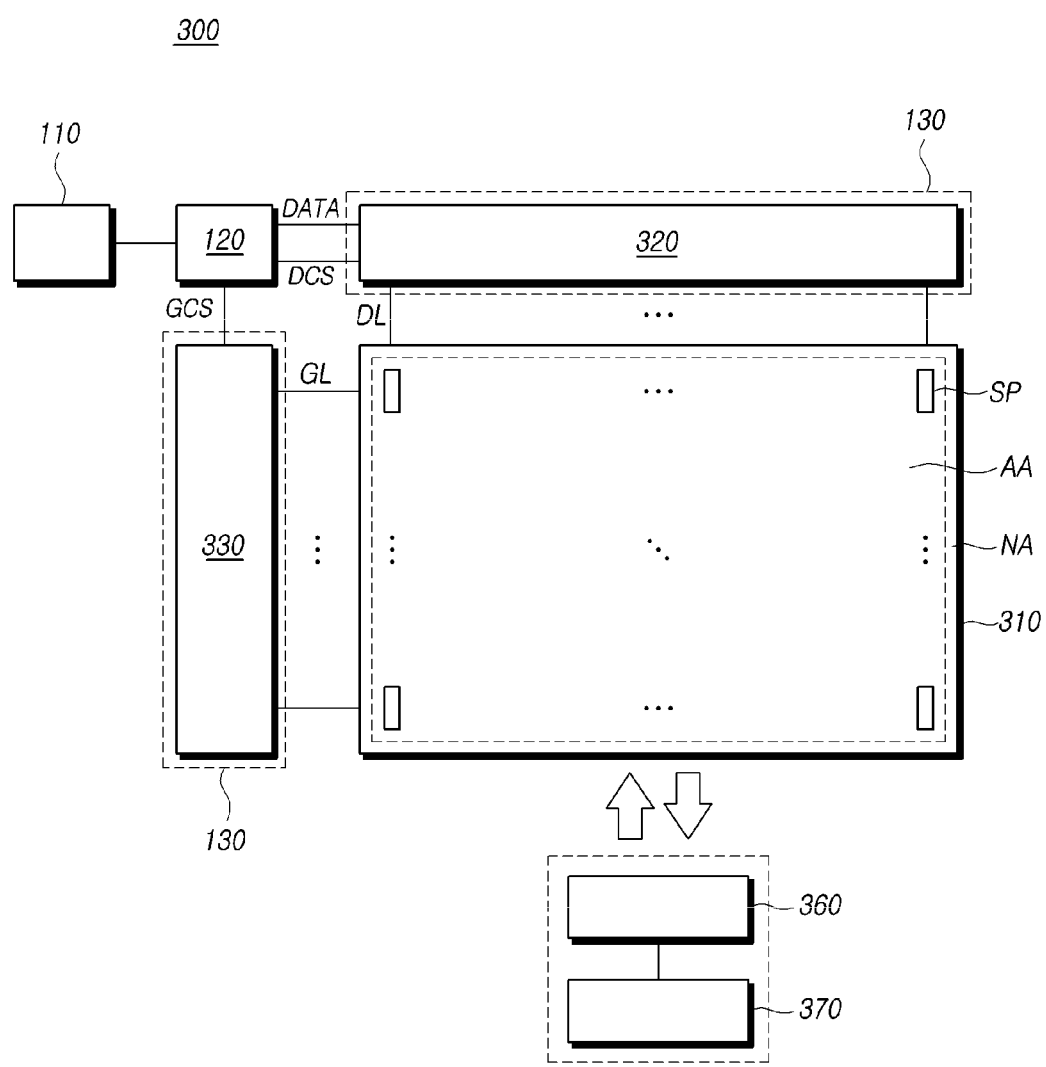
FIG. 3 is a view illustrating a system configuration of a display device including the control circuit of FIG. 1.

FIG. 3 is a view illustrating a system configuration of a display device 300 including the control circuit 100 of FIG. 1.

Referring to FIG. 3, a display device 300 according to embodiments of the disclosure may include a main processor 110, a timing controller 120 capable of communicating with the main processor 110, a display driving circuit 130 controlled for operation timings by the timing controller 120, and a display panel 310 where a plurality of data lines DL and a plurality of gate lines GL to which voltages output from the display driving circuit 130 are applied are disposed.

The display driving circuit 130 is a circuit for driving the display panel 310 and may include a data driving circuit 320 and a gate driving circuit 330.

The display panel 310 may include a display area AA in which images are displayed and a non-display area NA in which no image is displayed. The non-display area NA may be an outer area of the display area AA and be referred to as a bezel area. The whole or part of the non-display area NA may be an area visible from the front surface of the display device 300 or an area that is bent and not visible from the front surface of the display device 300.

The display panel 310 may include a substrate and a plurality of subpixels SP disposed on the substrate. The display panel 310 may further include various types of signal lines to drive the plurality of subpixels SP.

The display device 300 according to embodiments of the disclosure may be a liquid crystal display device or a light emission display device in which the display panel 310 emits light by itself. When the display device 300 according to the embodiments of the disclosure is a self-emission display device, each of the plurality of subpixels SP may include a light emitting element.

For example, the display device 300 according to embodiments of the disclosure may be an organic light emitting diode display in which the light emitting element is implemented as an organic light emitting diode (OLED). As another example, the display device 300 according to embodiments of the disclosure may be a quantum dot display device in which the light emitting element is implemented as a quantum dot which is self-emission semiconductor crystal.

For example, various types of signal lines may include a plurality of data lines DL transferring data signals (also referred to as data voltages or image signals) and a plurality of gate lines GL transferring gate signals (also referred to as gate voltages or scan signals).

The data driving circuit 320 is a circuit configured to drive the plurality of data lines DL, and may output data voltages to the plurality of data lines DL. The gate driving circuit 330 is a circuit configured to drive the plurality of gate lines GL, and may output gate signals to the plurality of gate lines GL.

The timing controller 120 may be a device configured to control the operation of the data driving circuit 320 and the gate driving circuit 330. The timing controller 120 may control driving timings for the plurality of data lines DL and driving timings for the plurality of gate lines GL.

The timing controller 120 may supply the data driving control signal DCS to the data driving circuit 320 to control the data driving circuit 320. The timing controller 120 may supply the gate driving control signal GCS to the gate driving circuit 330 to control the gate driving circuit 330.

The timing controller 120 may receive input image data from the main processor 110 and supply the image data DATA to the data driving circuit 320 based on the input image data.

The timing controller 120 may generate and output one or more synchronization signals to drive the data driving circuit 320 and the gate driving circuit 330 at accurate timings.

For example, the timing controller 120 may generate a vertical synchronization signal (also referred to as a Vsync signal) indicating the start of each frame. The timing controller 120 may generate a horizontal synchronization signal (also referred to as a Hsync signal) indicating the start of a horizontal line.

The data driving circuit 320 may supply data voltages to the plurality of data lines DL according to the driving timing control by the timing controller 120.

The data driving circuit 320 may receive digital image data DATA from the timing controller 120 and may convert the received image data DATA into analog data voltages and output them to the plurality of data lines DL.

The gate driving circuit 330 may supply gate signals to the plurality of gate lines GL according to the timing control of the timing controller 120. The gate driving circuit 330 may receive a first gate voltage corresponding to a turn-on level voltage and a second gate voltage corresponding to a turn-off level voltage, along with various gate driving control signals GCS, generate gate signals, and supply the generated gate signals to the plurality of gate lines GL.

For example, the data driving circuit 320 may be connected with the display panel 310 by a tape automated bonding (TAB) method or connected to a bonding pad of the display panel 310 by a chip on glass (COG) or chip on panel (COP) method or may be implemented by a chip on film (COF) method and connected with the display panel 310.

The gate driving circuit 330 may be connected with the display panel 310 by a tape automated bonding (TAB) method or connected to a bonding pad of the self-emission display panel 310 by a COG or chip on panel (COP) method or may be connected with the display panel 310 according to a COF method. The gate driving circuit 330 may be formed in a gate in panel (GIP) type, in the non-display area NA of the display panel 310.

Meanwhile, at least one of the data driving circuit 320 and the gate driving circuit 330 may be disposed in the display area AA of the display panel 310. For example, at least one of the data driving circuit 320 and the gate driving circuit 330 may be disposed not to overlap the subpixels SP or to overlap all or some of the subpixels SP.

The data driving circuit 320 may be connected with one side (e.g., an upper or lower side) of the display panel 310. Depending on the driving scheme or the design scheme, the data driving circuit 320 may be connected with both sides (e.g., upper and lower sides) of the self-emission display panel 310, or two or more of the four sides of the self-emission display panel 310.

The gate driving circuit 330 may be connected to one side (e.g., a left or right side) of the display panel 310. Depending on the driving scheme or the panel design scheme, the gate driving circuit 330 may be connected with both sides (e.g., left and right sides) of the display panel 310, or two or more of the four sides of the display panel 310.

The timing controller 120 may be implemented as a separate component from the data driving circuit 320, or the timing controller 120 and the data driving circuit 320 may be integrated into an integrated circuit (IC).

The timing controller 120 may be a timing controller used in typical display technology or a control device that may perform other control functions as well as the functions of the timing controller, or a circuit in the control device. The timing controller 120 may be implemented as various circuits or electronic components, such as an integrated circuit (IC), a field programmable gate array (FPGA), an application specific integrated circuit (ASIC), or a processor.

The timing controller 120 may be electrically connected to the data driving circuit 320 and the gate driving circuit 330 through a printed circuit board (PCB) or a flexible printed circuit board (FPCB).

The timing controller 120 may transmit/receive signals to/from the data driving circuit 320 according to one or more predetermined or selected interfaces. The interface may include, e.g., a low voltage differential signaling (LVDS) interface, an EPI interface, and a serial peripheral interface (SPI).

To provide a touch sensing function as well as an image display function, the display device 300 according to embodiments of the disclosure may include a touch sensor and a touch sensing circuit that senses the touch sensor to detect whether a touch occurs by a touch object, such as a finger or pen, or the position of the touch.

The touch sensing circuit may include a touch driving circuit 360 that drives and senses the touch sensor and generates and outputs touch sensing data and a touch controller 370 that may detect an occurrence of a touch or the position of the touch using touch sensing data.

The touch sensor may include a plurality of touch electrodes. The touch sensor may further include a plurality of touch lines for electrically connecting the plurality of touch electrodes and the touch driving circuit 360.

The touch sensor in the form of a touch panel may exist outside the display panel 310, or the touch sensor may exist inside the display panel 310. When the touch panel, in the form of a panel, exists outside the display panel 310, the touch panel is referred to as an external type. When the touch sensor is of the external type, the touch panel and the display panel 310 may be separately manufactured or may be combined during an assembly process. The external-type touch panel may include a touch panel substrate and a plurality of touch electrodes on the touch panel substrate.

When the touch sensor is present inside the display panel 310, the touch sensor may be formed on the substrate, together with signal lines and electrodes related to display driving, during the manufacturing process of the display panel 310.

The touch driving circuit 360 may supply a touch driving signal to at least one of the plurality of touch electrodes and may sense at least one of the plurality of touch electrodes to generate touch sensing data.

The touch sensing circuit may perform touch sensing in a self-capacitance sensing scheme or a mutual-capacitance sensing scheme.

The touch driving circuit 360 and the touch controller 370 included in the touch sensing circuit may be implemented as separate devices or as a single device. The touch driving circuit 360 and the data driving circuit 320 may be implemented as separate devices or as a single device.

The display device 300 may further include a power supply circuit for supplying various types of power to the data driving circuit 320 and/or the touch sensing circuit.

The display device 300 according to embodiments of the disclosure may be a mobile terminal, such as a smart phone or a tablet, or a monitor or television (TV) in various sizes but, without limited thereto, may be a display device in various types and various sizes capable of displaying information or images.

Figure 4:
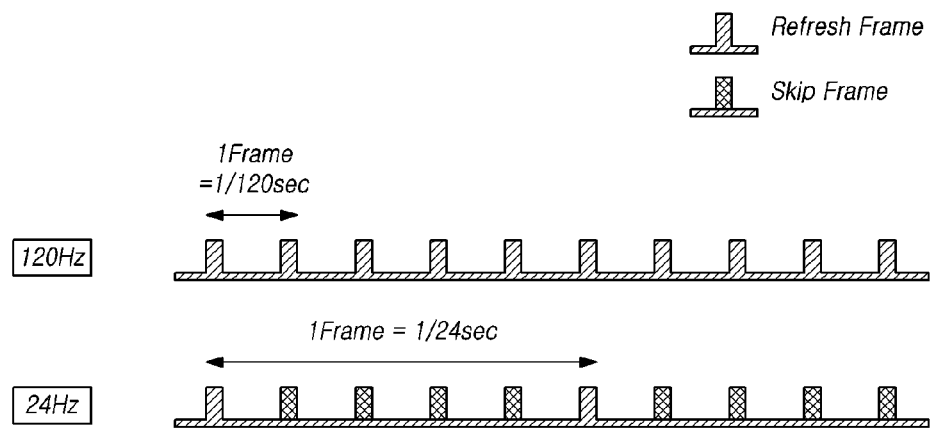
FIG. 4 is a view illustrating an example of implementing various refresh frame rates by a display device according to embodiments of the disclosure.

FIG. 4 is a view illustrating an example of implementing various refresh frame rates by a display device according to embodiments of the disclosure.

Referring to FIG. 4, the display device according to embodiments of the disclosure may implement various refresh frame rates by varying the ratio of the refresh frame to the skip frame based on the vertical synchronization signal. For example, the refresh frame and the skip frame may be started based on a rising edge or a falling edge of the vertical synchronization signal.

Refresh frame may refer to a frame period when the above-described data driving circuit 320 outputs data voltages of various levels according to the brightness of the subpixel. During the refresh frame period, data voltages of various levels may be applied to each subpixel according to the brightness of the image displayed by the corresponding subpixel.

The capacitor included in the subpixel is charged with the data voltage applied to the subpixel during the refresh frame period. Accordingly, the corresponding subpixel may emit light during one frame period.

The skip frame is distinguished from the refresh frame when data voltages of various levels are applied to each subpixel. During the skip frame period, a data voltage of a preset or selected level may be applied to the plurality of subpixels.

Accordingly, when a static still image is displayed in the display area for a long period of time, the image may be displayed at a low refresh frame rate. Accordingly, the power consumption in the data driving circuit may be reduced.

Referring to FIG. 4, if all the frames are refresh frames based on the vertical synchronization signal having a frequency of 120 Hz, the refresh frame rate is 120 Hz. In other words, when the refresh frame rate is equal to the frequency of the vertical synchronization signal, no skip frame may exist. In the case of displaying video content, a higher refresh frame rate may be preferable.

Accordingly, the time interval between refresh frames may be about 8.3 ms (1/120 sec).

After one refresh frame ends, one or more skip frames may be initiated.

Referring to FIG. 4, based on the vertical synchronization signal having a frequency of 120 Hz, after one refresh frame is finished, four skip frames are continuously started. According to this, the refresh frame rate is 24 Hz. The time interval between refresh frames is about 41.7 ms (1/24 sec).

The refresh frame rate may be controlled by the above-described main processor 110. For example, referring to FIG. 1, according to the refresh frame rate set by the main processor 110, the main processor 110 transmits pixel packets for generating image data to the timing controller 120 every frame or intermittently, so that various refresh frame rates may be implemented.

Figure 5:
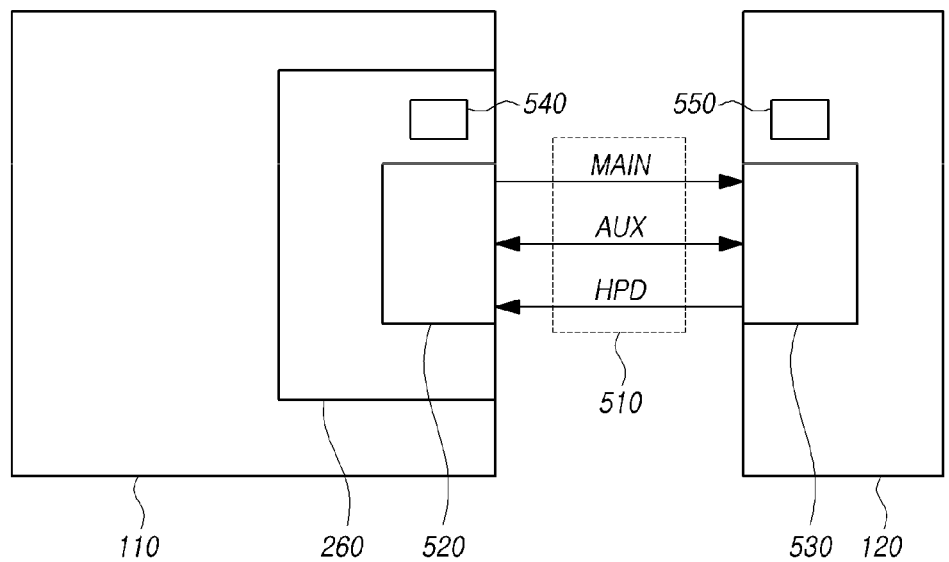
FIG. 5 is a view illustrating an interface between a main processor and a timing controller according to embodiments of the disclosure.

FIG. 5 is a view illustrating an interface 510 between a main processor 110 and a timing controller 120 according to embodiments of the disclosure.

Referring to FIG. 5, the interface 510 may be a display port including a main link (also referred to as MAIN or MAIN LINK), an auxiliary channel AUX, and a hot plug detector (HPD) signal line (hereinafter referred to as "HPD").

The main link MAIN of the display port is a channel for transmitting image data from the main processor 110 to the timing controller 120. The main link MAIN is a channel with a high bandwidth and a short call time, and is a simplex channel for transmitting data from the main processor 110 to the timing controller 120.

The auxiliary channel AUX of the display port is a half-duplex, bidirectional channel used for link management and device control.

The HPD is used to indicate a connection state between the main processor 110 and the timing controller 120.

Transmitted data may be converted into 8B/10B code or Manchester code and be transmitted from the source transmission/reception circuit 520 and the sink transmission/reception circuit 530 to the interface 510.

The source transmission/reception circuit 520 and the sink transmission/reception circuit 530 may include one or more transmitters for transmitting data and one or more receivers for receiving data. The source transmission/reception circuit 520 and the sink transmission/reception circuit 530 constitute a physical layer.

Referring to FIG. 5, the main processor 110 and the timing controller 120 include timing generators 540 and 550, respectively.

The timing generator 540 included in the main processor 110 may be a device that generates a timing signal for synchronizing the signal received from the timing controller 120. The timing generator 550 included in the timing controller 120 may be a device that generates a timing signal for synchronizing the signal received from the main processor 110.

The timing generators 540 and 550 may function as a clock generator generating a clock signal.

The main processor 110 and the timing controller 120 may be synchronized with each other by the timing generators 540 and 550.

Figure 6:
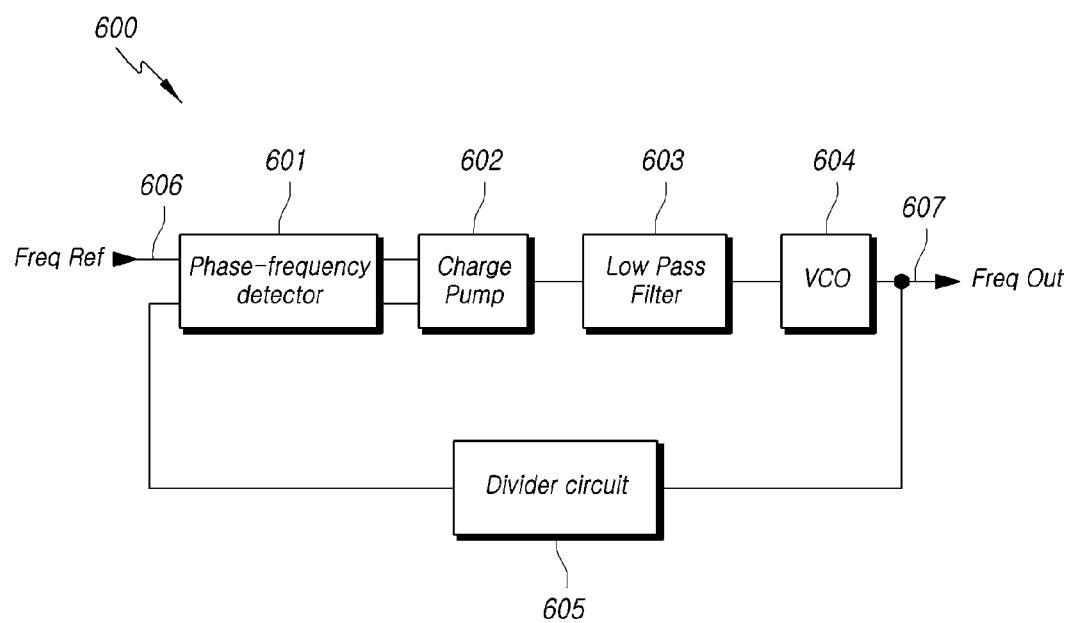
FIG. 6 is a block diagram illustrating a configuration of a phase locked loop.

FIG. 6 is a block diagram illustrating a configuration of a phase locked loop (PLL) 600.

The above-described timing generators 540 and 550 of FIG. 5 may include a phase locked loop 600.

The phase locked loop 600 may include a phase-frequency detector 601, a charge pump 602, a low pass filter 603, a voltage controlled oscillator (VCO) 604, and a divider circuit 605.

Referring to FIG. 6, the phase-frequency detector 601 receives a reference frequency Freq Ref input to the input terminal 606 of the phase locked loop 600 and a feedback signal input from the divider circuit 605. The phase-frequency detector 601 generates a pulse based on a phase difference between two input signals and outputs the pulse. The pulse output from the phase-frequency detector 601 is input to the charge pump 602.

The output of the charge pump 602 is connected to the input of the voltage controlled oscillator 604 through the low pass filter 603. The output terminal 607 of the voltage controlled oscillator 604 is connected to the input terminal of the divider circuit 605.

The phase-frequency detector 601 may be configured to compare the output of the divider circuit 605 with the reference frequency Freq Ref and generate a pulse proportional to the phase difference between the compared signals.

The phase-frequency detector 601 may be implemented, e.g., by adding the outputs of two analog multipliers. Alternatively, the phase-frequency detector 601 may be implemented through a combination of an exclusive-OR logic gate, a flip-flop, or a digital logic gate.

The charge pump 602 may be configured to charge and discharge the capacitor according to the output of the phase-frequency detector 601. The phase-frequency detector 601 may provide two output signals, referred to as 'up' and 'down'. Each of the two output signals may be a signal for charging the capacitor or a signal for discharging the capacitor. Accordingly, the voltage across the capacitor is proportional to the phase difference between the pulse input to the input terminal 606 of the phase locked loop 600 and the pulse input from the divider circuit 605.

The charge pump 602 may supply current to the capacitor via, e.g., a p-channel MOSFET and may discharge current from the capacitor through an n-channel MOSFET.

The phase-locked loop 600 may further include a low-pass filter 603 configured to remove high-frequency harmonic components output from the output end of the phase-frequency detector 601. The low-pass filter 603 may be implemented as a passive filter configured by connecting a resistor and a capacitor in series. The low-pass filter 603 may be implemented as an active filter. In this case, the low-pass filter 603 may include an amplifier, such as an operational amplifier (also referred to as an "op-amp"), and a feedback path including a resistor and a capacitor.

The cutoff frequency of the low-pass filter 603 may be preset or selected to determine a "capture range" in which the phase-locked loop 600 operates.

The voltage controlled oscillator 604 may be configured to output a frequency dependent on the output of the charge pump 602 filtered in the low pass filter 603.

The voltage controlled oscillator 604 may be implemented as a harmonic oscillator or a relaxation oscillator. The variable current as the capacitor of the charge pump 602 is charged and discharged may change the frequency of the voltage controlled oscillator 604. Accordingly, the output of the voltage controlled oscillator 604 depends on the output of the charge pump 602.

Referring to FIG. 6, the divider circuit 605 may be configured to divide the signal output from the output terminal 607 of the voltage controlled oscillator 604 into preset or selected values. According to this, the frequency divided as the preset value may be input to the phase-frequency detector 601. Accordingly, a frequency different from that of the signal input to the input terminal 606 may be output to the output terminal 607.

A signal of a preset or selected frequency is input to the input terminal 606. For example, a crystal oscillator, an RC oscillator, or an LC oscillator may be used as a component for outputting the signal of the preset frequency.

The preset frequency is within a frequency range beneficial for the phase locked loop 600 to operate. The range in which the phase-locked loop 600 operates may be referred to as a "capture range".

When the preset frequency is higher than the frequency of the signal output from the divider circuit 605, the phase-frequency detector 601 may send a signal to the charge pump 602 to charge the capacitor included in the charge pump 602. When the preset frequency is lower than the frequency of the signal output from the divider circuit 605, the phase-frequency detector 601 may send a signal to the charge pump 602 to remove the charge of the capacitor included in the charge pump 602.

Alternatively, when the preset frequency is higher than the frequency of the signal output from the divider circuit 605, the phase-frequency detector 601 may send a signal to the charge pump 602 to remove the charge in the capacitor included in the charge pump 602. When the preset frequency is lower than the frequency of the signal output from the divider circuit 605, the phase-frequency detector 601 may send a signal to the charge pump 602 to charge the capacitor included in the charge pump 602.

The signal output from the charge pump 602 is filtered by the low-pass filter 603, and the filtered signal is input to the voltage controlled oscillator 604. The voltage controlled oscillator 604 may generate and output a signal of a frequency corresponding to the filtered signal.

When the frequency and phase of the signal input to the input terminal 606 of the phase locked loop 600 are the same as the frequency and phase of the signal output from the output terminal 607 of the phase locked loop 600, the phase locked loop 600 is expressed as "locked".

When the frequency or phase of the signal input to the input terminal 606 of the phase locked loop 600 is different from the frequency or phase of the signal output from the output terminal 607 of the phase locked loop 600 (i.e., when the phase locked loop 600 is not locked), the frequency or phase of the signal output from the output terminal 607 through the above-described feedback process may be compensated.

Figure 7:
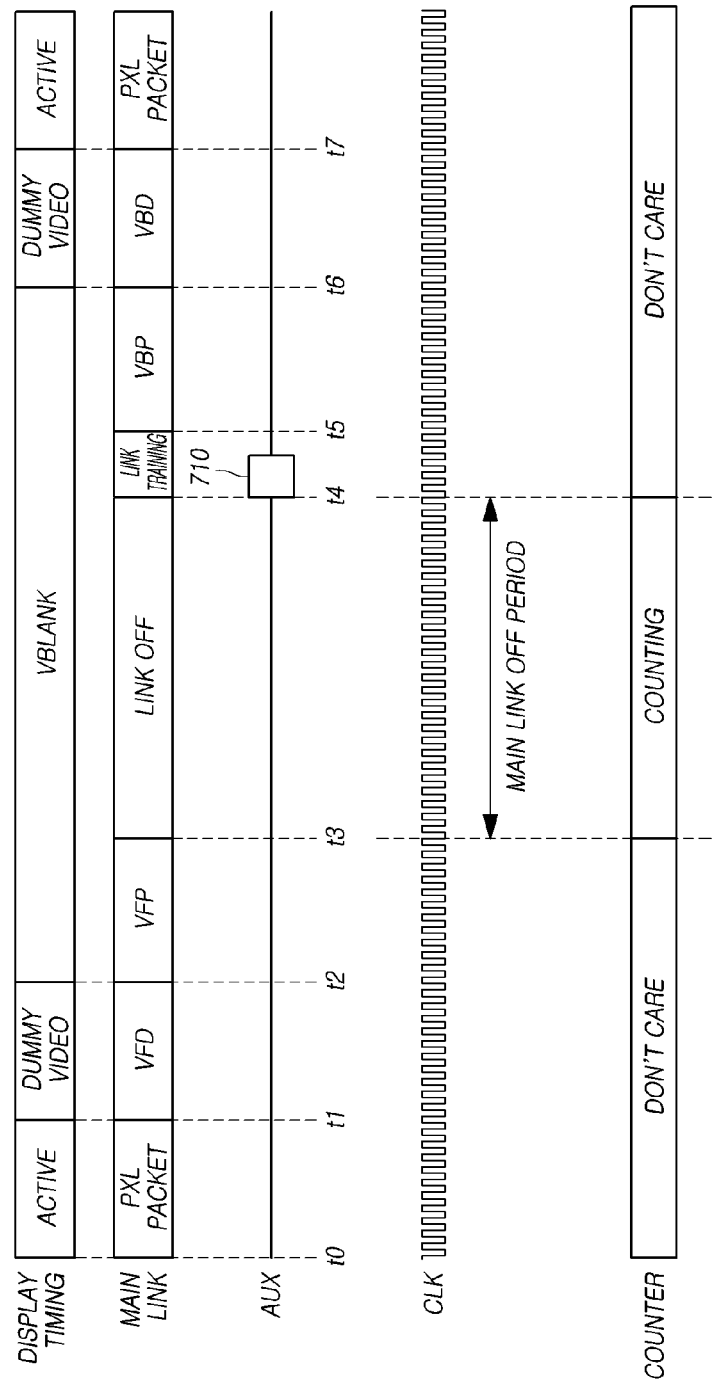
FIG. 7 is a view illustrating display timings of a display device and states of a main link and an auxiliary channel according to the display timings, according to embodiments of the disclosure.

FIG. 7 is a view illustrating display timings of a display device and states of a main link MAIN (MAIN LINK) and an auxiliary channel AUX according to the display timings, according to embodiments of the disclosure.

Referring to FIG. 7, the display timings of the display device according to embodiments of the disclosure may include an active period ACTIVE and a vertical blank period VBLANK.

The active period ACTIVE of FIG. 7 corresponds to a period when the main processor transmits a pixel packet PXL PACKET for image display to the timing controller through the main link MAIN LINK.

The pixel packet PXL PACKET may include, in addition to image data for actually displaying an image, information, such as the number of pixels (or subpixels) arranged on the horizontal line, the total number of lines in one image frame, the width of the horizontal synchronization signal, and the width of the vertical synchronization signal.

In other words, the active period ACTIVE of FIG. 7 may correspond to a period when the data voltage for image display is applied to a plurality of data lines (a period between t0 to t1 and a period after t7) of the above-described refresh frame period.

Referring to FIG. 7, the display timings may further include dummy image periods DUMMY VIDEO before and after the active period ACTIVE. (period t1 to t2 and period t6 to t7 in FIG. 7)

The dummy image period DUMMY VIDEO is not a period when image data for image display is input to the display area. For example, when a dummy gate line not electrically connected to the subpixel is further disposed in the non-display area of the display panel, a gate signal may be output to the dummy gate line during the dummy image period DUMMY VIDEO.

Accordingly, whether the gate signal is input to the gate line disposed in the display area of the display panel at an appropriate timing may be indirectly identified by detecting the output timing of the gate signal input to the dummy gate line.

During the dummy image period DUMMY VIDEO, the main link MAIN LINK may transfer vertical front dummy data VFD or vertical back dummy data VBD.

In some cases, a gate signal may be input to the dummy gate line during a partial period of the vertical blank period VBLANK. In this case, the dummy image period DUMMY VIDEO may be omitted.

According to this, the period when the main link MAIN LINK transfers the vertical front dummy data VFD or vertical back dummy data VBD signal may overlap the vertical blank period VBLANK.

Referring to FIG. 7, in a period that does not overlap the active period ACTIVE, a vertical blank period VBLANK exists. The vertical blank period VBLANK may include the vertical blank period and skip frame period of the refresh frame. Accordingly, the length of the vertical blank period VBLANK may exceed the length of one frame period (e.g., about 8.3 ms based on 120 Hz).

When the period (the period of t1 to t2) when the main link transfers the vertical front dummy data VFD ends, the main link MAIN LINK enters the period (a period of t2 to t3) to transfer the vertical front porch VFP signal. When the period (period of t5 to t6) when the main link MAIN LINK transfers the vertical back porch VBP signal ends, the main link MAIN LINK enters a period (period of t6 to t7) to transfer the vertical back dummy data VBD.

During the period (period t2 to t3) when the main link MAIN LINK transfers the vertical front porch VFP signal or the period (period t5 to t6) when the main link MAIN LINK transfers the vertical back porch VBP signal, the main processor may transmit the pixel packet PXL PACKET and other data to the timing controller via the main link MAIN LINK.

For example, the main processor may transmit timing data for performing a touch sensing function to the timing controller through the main link MAIN LINK. The timing controller may receive timing data for performing a touch sensing function, generate a touch synchronization signal (e.g., a Tsync signal), and output it to the above-described touch controller.

Alternatively, the main processor may transmit data for adjusting the brightness of the screen to the timing controller through the main link MAIN LINK. Accordingly, the timing controller may adjust the brightness of the subpixels according to a set value based on the received data, even without receiving new image data.

Referring to FIG. 7, during the period (corresponding to the period t3 to t5) between the time (corresponding to t3) when the transfer of the vertical front porch VFP signal through the main link MAIN LINK is ended and the start (corresponding to t5) when the transfer of the vertical back porch VBP signal is started, the transmission/reception circuit (e.g., the source transmission/reception circuit and/or sink transmission/reception circuit) connected with the main link MAIN LINK may be powered off.

Referring to FIGS. 5 and 7, it is possible to reduce power consumption by powering off the transmission/reception circuits 520 and 530 connected with the main link MAIN LINK during at least a partial period of the corresponding period (period t3 to t5).

From a perspective of the main link MAIN LINK, the powered off state of the source transmission/reception circuit 520 and/or the sink transmission/reception circuit 530 connected to the main link MAIN LINK may be referred to as a link-off state LINK OFF. The link-off state LINK OFF is also referred to as a "sleep" state.

On the contrary, from the viewpoint of the main link MAIN LINK, the powered-on state of the source transmission/reception circuit 520 and the sink transmission/reception circuit 530 connected to the main link MAIN LINK may be referred to as a "link-on" state.

The link-off state of the main link MAIN LINK may be terminated as the main processor transmits the active synchronization signal 710 to the timing controller through the auxiliary channel AUX.

Therefore, while the main link MAIN LINK is in the link-off state, the source transmission/reception circuit 520 and the sink transmission/reception circuit 530 connected to the auxiliary channel AUX may be in the powered-on state. Accordingly, while the main link MAIN LINK is in the "link-off" state, the auxiliary channel AUX may be in the "link-on" state.

Referring to FIG. 7, the active synchronization signal 710 is transmitted from the main processor to the timing controller through the auxiliary channel AUX at time t4, and the link-off state of the main link MAIN LINK is terminated.

If the link-off state of the main link MAIN LINK is terminated, transmission of the link training signal LINK TRAINING through the main link MAIN LINK is started.

The link training signal LINK TRAINING may include a clock recovery parameter. The timing controller may receive the clock recovery parameter and recover the clock which has caused the error through the above-described phase locked loop 600. (refer to FIG. 6)

The link training signal LINK TRAINING may include one or more symbol lock patterns. The symbol lock pattern may be transmitted through the main link after transmission of the clock recovery parameter is completed. The timing controller may receive the symbol lock pattern and may be synchronized with the main processor.

Accordingly, the main processor and the timing controller are synchronized at the time (time t5) when the main processor ends transmission of the link training signal LINK TRAINING. After the main processor ends transmitting the link training signal LINK TRAINING, the main link MAIN LINK may transfer the vertical back porch signal VBP and the vertical back dummy data VBD.

Referring to FIG. 7, during the period when the main link MAIN LINK is in the "link-off" state, the auxiliary channel AUX is in the "link-on" state. Since the main processor should transfer the active synchronization signal 710 through the auxiliary channel AUX to end the link-off state of the main link MAIN LINK, it may be difficult to keep the auxiliary channel AUX in the link-off state.

According to the embodiments of the disclosure, both the main link MAIN LINK and the auxiliary channel AUX may be switched to the link-off state based on the number of pulses of the clock signal CLK.

Referring to FIG. 7, based on the number of pulses of the clock signal CLK corresponding to the period (period of t3 to t4) when the main link MAIN LINK is in the link-off state, both the main link MAIN LINK and the auxiliary channel AUX may be maintained in the link-off state. The clock signal CLK may be a signal output from the above-described timing generators 540 and 550 (refer to FIG. 5).

The main processor and/or the timing controller according to embodiments of the disclosure may further include a counter COUNTER for calculating the number of pulses of the clock signal CLK.

The counter COUNTER may receive the clock signal CLK and detect the rising edges or falling edges of the pulses of the clock signal CLK, thereby calculating the number of pulses. The number of pulses of the clock signal CLK calculated by the counter COUNTER during a predetermined or selected period corresponds to the length of the corresponding period.

Accordingly, the length of the link-off period of the main link MAIN LINK may be replaced with the number of pulses calculated by the counter COUNTER.

The counter COUNTER included in the main processor may output the calculated number of pulses to the main processor. The counter COUNTER included in the timing controller may output the calculated number of pulses to the timing controller.

Described below with reference to FIGS. 5 and 7 is a method for adjusting the period when the main processor 110 powers off the transmission/reception circuits 520 and 530 connected to the main link MAIN LINK and the transmission/reception circuit 520 and 530 connected to the auxiliary channel AUX.

According to embodiments of the present disclosure, the main processor 110 may include a memory (not shown). A value for the length of the vertical blank period VBLANK according to the refresh frame rate may be previously stored in the memory.

The memory storing the value for the length of the vertical blank period VBLANK may be a memory included in the main processor 110 or an external memory connected to the main processor 110. When the memory is included in the main processor 110, the display controller 270 may include the memory.

The main processor 110 powers off the transmission/reception circuit 520 connected to the main link MAIN LINK at time t3 based on the refresh frame rate information about the image data transmitted through the main link MAIN LINK.

Accordingly, the source transmission/reception circuit 520 connected to the main link MAIN LINK may be powered off.

The main processor 110 may power off the source transmission/reception circuit 520 connected to the auxiliary channel AUX at time t3.

The source transmission/reception circuit 520 and the sink transmission/reception circuit 530 connected to the auxiliary channel AUX may be designed to be connected to the same power source. As the source transmission/reception circuit 520 and the sink transmission/reception circuit 530 connected to the auxiliary channel AUX are connected to one power source, the source transmission/reception circuit 520 and the sink transmission/reception circuit 530 may be powered off at the same time. Accordingly, the effect of reducing power consumption may be further increased.

Accordingly, at time t3, both the main link MAIN LINK and the auxiliary channel AUX may be switched to a "link-off" state.

The counter COUTNER counts the number of pulses from time t3 based on the clock signal CLK and outputs the count result value.

The main processor 110 compares the output value of the counter COUNTER and the previously stored length of the vertical blank period VBLANK. When the output value of the counter COUNTER is equal to the preset or selected length of the vertical blank period VBLANK, the main processor 110 powers on the source transmission/reception circuit 520 connected to the main link MAIN LINK and powers on the source transmission/reception circuit 520 and the sink transmission/reception circuit 530 connected to the auxiliary channel AUX. In other words, according to the value output by the counter COUNTER at time t4, the main processor 110 may switch the main link MAIN LINK and the auxiliary channel AUX from the "link-off" state to the "link-on" state.

If both the main link MAIN LINK and the auxiliary channel AUX are switched from the "link-off" state to the "link-on" state, the main processor 110 transmits the link training signal LINK TRAINING through the main link MAIN LINK to the timing controller 120. The timing controller 120 may receive the link training signal LINK TRAINING and perform a process for synchronization with the main processor 110.

The main processor 110 may initialize the output value of the counter COUNTER after time t4.

According to embodiments of the present disclosure, the main processor 110 may include a memory (not shown), and the value for the length of the vertical blank period VBLANK according to the refresh frame rate may not be previously stored in the memory. In this case, the value stored in the memory may be updated based on a value output from the counter COUNTER.

For example, in the first vertical blank period VBLANK in which the refresh frame rate is not maintained but changed, the main link MAIN LINK may be in the "link-off" state, and the auxiliary channel AUX may maintain the "link-on" state while the main link MAIN LINK is in the "link-off" state.

The counter COUNTER counts the number of pulses of the clock signal CLK from time t3. The counter COUNTER counts the number of pulses of the clock signal CLK from time t3 to time t4 when the main processor 110 transmits the active synchronization signal 710 to the auxiliary channel AUX (that is, the period from t3 to t4).

The counter COUNTER may output the number of pulses of the clock signal CLK counted during the period from t3 to t4, and the main processor 110 may store the output value of the counter COUNTER in the memory.

In the vertical blank period VBLANK during which the refresh frame rate is maintained, both the main link MAIN LINK and the auxiliary channel AUX may be in the "link-off" state.

The main processor 110 may receive a value output from the counter COUNTER from time t3. The main processor 110 may compare the value stored in the memory with the value output from the counter COUNTER. When the two values compared become equal, the main processor 110 may switch the states of the main link MAIN LINK and the auxiliary channel AUX from the "link-off" state to the "link-on" state.

Accordingly, both the main link MAIN LINK and the auxiliary channel AUX may be in the "link-off" state during at least a partial period of the vertical blank period VBLANK. Accordingly, power consumption may be reduced.

Referring to FIG. 7, during the periods before time t3 and after time t4, the counter COUNTER may or may not count the number of pulses of the clock signal CLK. (DON'T CARE)

Figure 8:
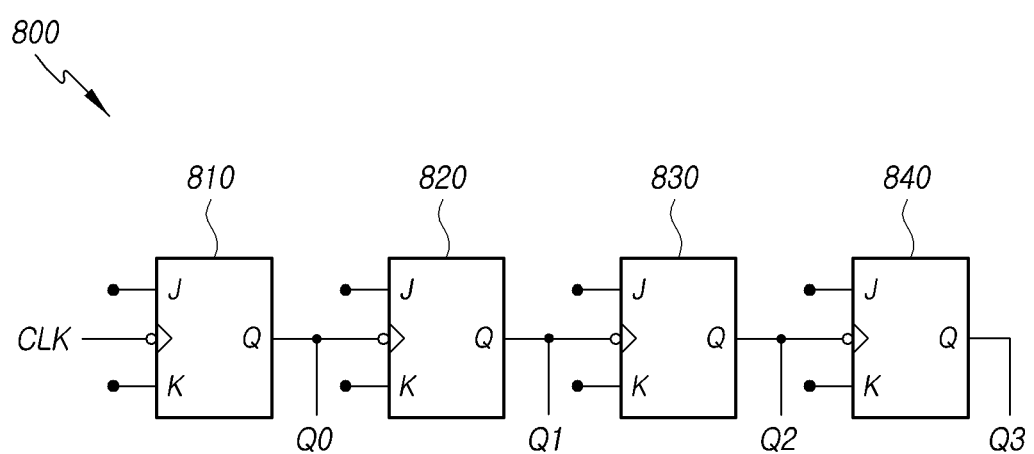
Figure 9:
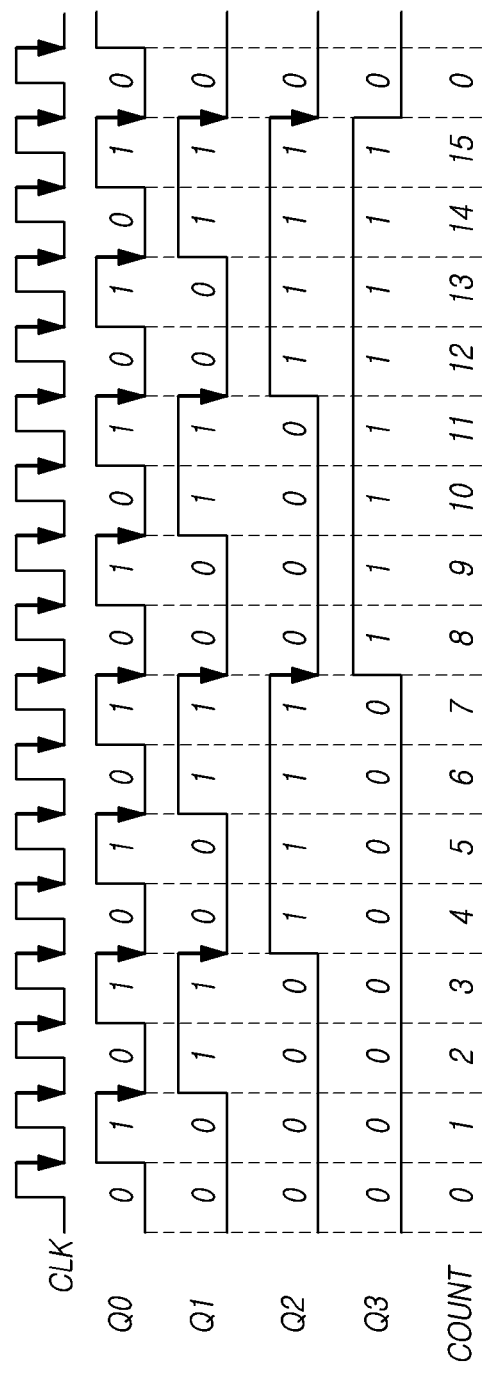

FIGS. 8 to 10 are views exemplarily illustrating an embodiment and operation method of a counter 800.

Referring to FIG. 8, the counter 800 may be configured to receive the clock signal CLK and calculate the number of pulses of the input signal. The counter 800 of FIG. 8 is merely an example for implementing the counter COUNTER of FIG. 7, but is not limited thereto.

Referring to FIG. 8, the counter 800 may include two or more flip-flops 810, 820, 830, and 840. For example, the counter 800 may include a first flip-flop 810, a second flip-flop 820, a third flip-flop 830, and a fourth flip-flop 840.

A clock signal CLK is input to the input terminal of the first flip-flop 810. An output terminal of the first flip-flop 810 is connected to an input terminal of the second flip-flop 820. An output terminal of the second flip-flop 820 is connected to an input terminal of the third flip-flop 830. An output terminal of the third flip-flop 830 is connected to an input terminal of the fourth flip-flop 840.

The output value Q0 of the first flip-flop 810 is input to the input terminal of the second flip-flop 820. The output value Q1 of the second flip-flop 820 is input to the input terminal of the third flip-flop 830. The output value Q2 of the third flip-flop 830 is input to the input terminal of the fourth flip-flop 840. The output value of the fourth flip-flop 840 is Q3.

Each of the first to fourth flip-flops 810 to 840 detects a rising edge or a falling edge of a pulse. When the rising edge or falling edge of the pulse is detected, the phase of the output value is changed. Each of the first to fourth flip-flops 810 to 840 may be implemented as a conventional JK flip-flop.

FIG. 9 is a view illustrating a principle in which the counter 800 of FIG. 8 counts the number of pulses of the clock signal CLK.

Referring to FIGS. 8 and 9, the first to fourth flip-flops 810 to 840 may detect the falling edge of the input pulse. For example, when the logic value of the clock signal CLK input to the first flip-flop 810 changes from 1 to 0, the logic value of the output value Q0 of the first flip-flop 810 changes. Accordingly, the Q0 value varies from 0 to 1, or from 1 to 0.

Accordingly, the frequency of the signal output from each of the first to fourth flip-flops 810 to 840 is half the frequency of the input signal.

Accordingly, the output value Q0 of the first flip-flop 810, the output value Q1 of the second flip-flop 820, the output value Q2 of the third flip-flop 830, and the output value Q3 of the fourth flip-flop 840 may be used to express the number of the pulses of the clock signal CLK as a binary number.

Accordingly, the counter 800 including N flip-flops may count the number of pulses of the clock signal CLK up to $2^N$.

Referring to FIG. 9, if the values of Q0, Q1, Q2, and Q3 are 0, 0, 0, and 0, respectively, the number of pulses is counted as 0. If the values of Q0, Q1, Q2, and Q3 are 1, 0, 0, and 0, respectively, the number of pulses is counted as 1. If the values of Q0, Q1, Q2, and Q3 are 1, 1, 1, and 1, respectively, the number of pulses is counted as 15.

Accordingly, it is possible to configure a counter 800 capable of counting the number of 16 pulses using the first to fourth flip-flops 810 to 840.

FIG. 10 is a truth table of the counter 800 of FIG. 8.

Referring to FIG. 10, Q0 corresponds to the first digit of the binary number, Q1 corresponds to the second digit of the binary number, Q2 corresponds to the third digit of the binary number, and Q3 corresponds to the fourth digit of the binary number.

When the number of counted pulses increases by 1, the value of Q0 increases by 1. After the values of Q0, Q1, Q2, and Q3 all become 1, if the value of Q0 increases by 1, Q0, Q1, Q2, and Q3 all return to 0.

Accordingly, up to 16 pulses of the clock signal may be detected during a predetermined or selected period using the logic values of Q0, Q1, Q2, and Q3.

FIGS. 8 to 10 show only one example for implementing the counter COUNTER of FIG. 7, but is not limited thereto. A design change may be made so that the maximum or greatest number of pulses that the counter may count (e.g., the maximum or greatest number of pulses detectable by the counter 800 shown in FIG. 8 is 16) is varied considering, e.g., the length of the link-off LINK OFF period of the main link and the auxiliary channel and the frequency of the clock signal CLK which serves as a reference.

Figure 11:
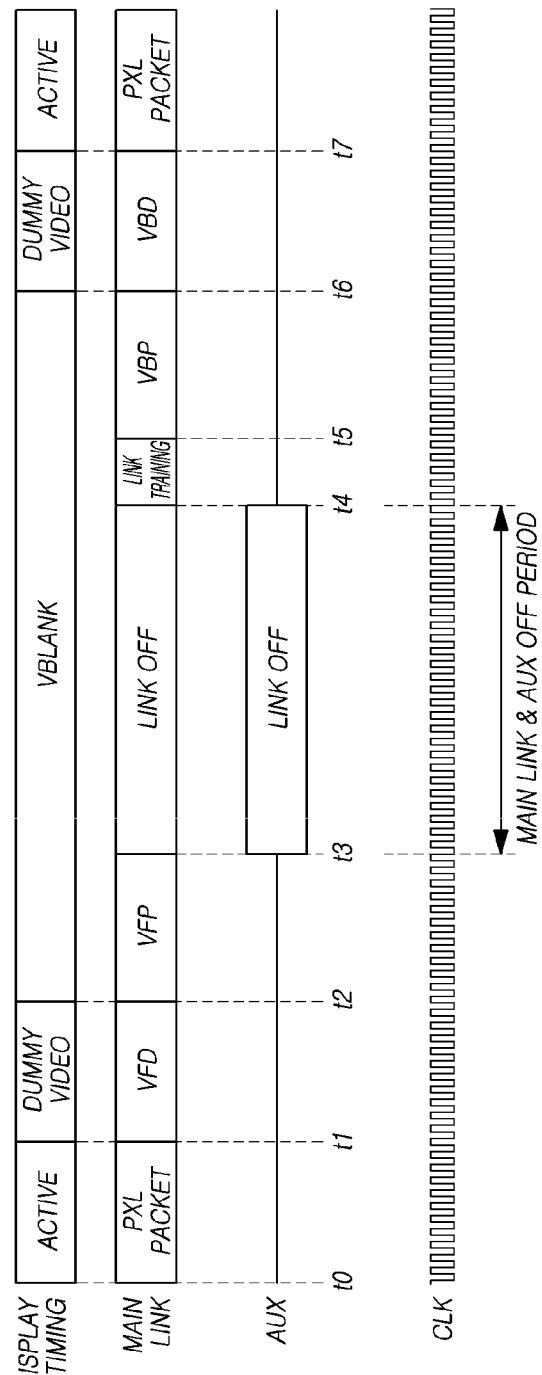
FIG. 11 is a view illustrating that a main link and an auxiliary channel both are in a link-off state during at least a partial period of a vertical blank period.

FIG. 11 is a view illustrating that a main link MAIN LINK and an auxiliary channel AUX both are in a link-off state during at least a partial period of a vertical blank period VBLANK.

Referring to FIG. 11, the main link MAIN LINK may be in a link-off state during a period t3 to t4. The auxiliary channel AUX may be in a link-off state during the period t3 to t4. In some cases, the auxiliary channel AUX may be in a link-off state during at least a partial period from the period t3 to t4, and may be in a link-on state during the remaining partial period.

Referring to FIG. 11, a preset or selected level of constant voltage may be applied to the auxiliary channel AUX at the time when the link training signal LINK TRAINING is transmitted to the main link MAIN LINK. In other words, the active synchronization signal 710 (refer to FIG. 7) may not be applied to the auxiliary channel AUX, but the preset level of constant voltage may be applied to the auxiliary channel AUX. Although the active synchronization signal 710 is not transmitted through the auxiliary channel AUX, the link training signal LINK TRAINING may be transmitted through the main link MAIN LINK.

The length (the length of the period t3 to t4) of the period when the main link MAIN LINK and the auxiliary channel AUX are in the link-off state may be replaced with the number of pulses of the CLK signal.

The above-described counter COUNTER (refer to FIG. 7) may count the number of pulses of the clock signal CLK from time t3.

The main processor adjusts the length of the period when the main link MAIN LINK and the auxiliary channel AUX are in the link-off state based on the refresh frame rate. The main processor may adjust the length of the period according to the number of pulses calculated by the counter COUNTER.

The clock signal CLK for which the counter COUNTER counts the number of pulses may be, e.g., a signal having the same frequency as the horizontal synchronization signal (also referred to as an Hsync signal) generated and output by the timing controller.

Accordingly, the main processor according to embodiments of the disclosure may control the transmission/reception circuit 240 (refer to FIG. 2) to have a period when both the main link MAIN LINK and the auxiliary channel AUX are in the link-off state.

Figure 12:
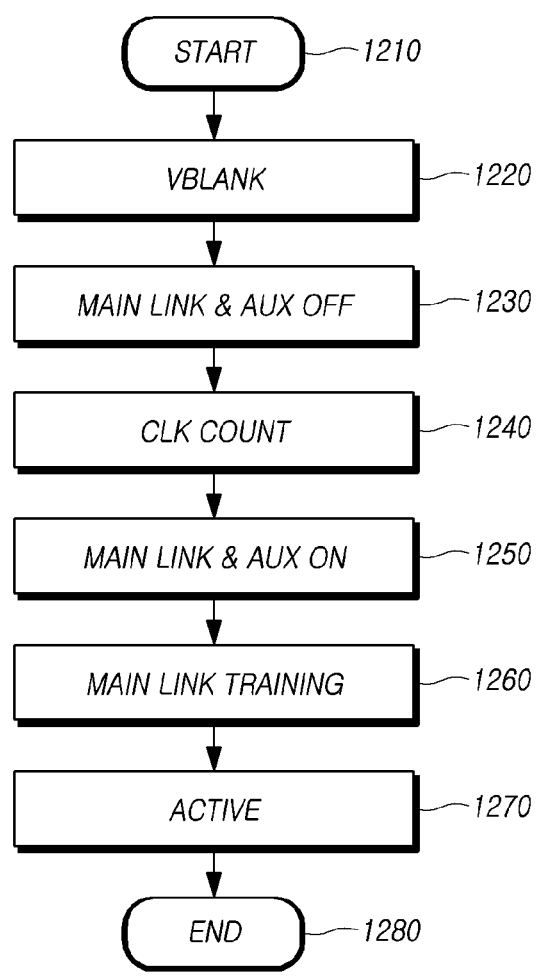

FIG. 12 is a flowchart illustrating a method 1200 for driving a main processor according to embodiments of the disclosure.

Referring to FIG. 12, the start of the flowchart is at (1210). The start of the flowchart may correspond to a step in which the main processor transmits a pixel packet for generating image data to the timing controller through the main link.

If the display timing enters the vertical blank period VBLANK, the main processor may transmit a signal for generating, e.g., a touch signal through the main link (1220). The signal transmitted through the main link during the vertical blank period VBLANK may be a signal other than the image data.

The main processor may power off the transmission/reception circuit (e.g., the source transmission/reception circuit) so that the main link MAIN LINK and the auxiliary channel AUX are switched to the link-off state during the vertical blank period VBLANK (1230).

The main processor counts the number of pulses based on the clock signal after the main link MAIN LINK and the auxiliary channel AUX are switched to the link-off state (1240). A counter included in the main processor may count the number of pulses of the clock signal.

If the number of pulses of the clock signal calculated by the counter is equal to the number of pulses of the clock signal corresponding to the preset or selected length of the link-off period, the main processor powers on the transmission/reception circuit connected with the main link MAIN LINK and the auxiliary channel AUX (1250). Accordingly, the main link MAIN LINK and the auxiliary channel AUX are switched to the link-on state.

The main processor transmits a link training signal LINK TRAINING to the timing controller through the main link MAIN LINK (1260). The timing controller synchronizes with the main processor based on the received link training signal.

The main processor transmits a pixel packet for image display to the timing controller through the MAIN LINK during the active period ACTIVE (1270).

The end of the flow chart is at (1280).

Accordingly, in the method for driving the main processor according to embodiments of the disclosure, the training signal is transmitted through the MAIN LINK even when the active synchronization signal indicating the start of the active period is not transmitted through the auxiliary channel.

Accordingly, while the main link MAIN LINK is in the link-off state, the auxiliary channel AUX may be in the link-off state. In other words, power consumption may be reduced by powering off the transmission/reception circuit connected to the auxiliary channel AUX.

FIG. 13 is a flowchart illustrating a method 1300 for driving a main processor according to embodiments of the disclosure.

Referring to FIG. 13, the start of the flowchart is at (1310). The start of the flowchart may correspond to a step in which the main processor transmits a pixel packet for generating image data to the timing controller through the main link.

If the display timing enters the vertical blank period VBLANK, the main processor may transmit a timing signal for generating, e.g., a touch signal through the main link MAIN LINK (1315).

During a period when the display timing is the vertical blank period VBLANK, the main processor may power off the transmission/reception circuit (e.g., a source transmission/reception circuit) connected to the main link MAIN LINK (1320). Accordingly, the main link MAIN LINK may be in the link-off state.

After powering off the transmission/reception circuit connected to the main link, the main processor counts the number of pulses of the clock signal CLK (1325). A counter included in the main processor may count the number of pulses of the clock signal.

The main processor transmits the active synchronization signal ACTIVE SYNC indicating the start of the active period to the timing controller through the auxiliary channel AUX (1330). The main processor stores, in the memory, the number of pulses of the clock signal counted by the counter until the time when the active synchronization signal ACTIVE SYNC is output to the auxiliary channel AUX.

In the active period ACTIVE, the main processor transmits a pixel packet for generating image data to the timing controller through the MAIN LINK (1335).

After the active period ACTIVE ends, the display timing enters the vertical blank period VBLANK (1340). The main processor may transmit a timing signal for generating, e.g., a touch signal through the main link MAIN LINK.

The main processor powers off the transmission/reception circuit electrically connected to the main link MAIN LINK and powers off the transmission/reception circuit electrically connected to the auxiliary channel AUX (1345). Accordingly, the main link and the auxiliary channel enter the link-off state.

The main processor counts the number of pulses of the clock signal CLK (1350). The counter included in the main processor may count the number of pulses of the clock signal.

If the number of pulses counted by the counter is equal to the number of pulses of the clock signal stored in the memory, the main processor powers on the transmission/reception circuit connected to the main link MAIN LINK and the transmission/reception circuit connected to the auxiliary channel AUX (1355). Accordingly, the main link MAIN LINK and the auxiliary channel AUX are switched to the link-on state. The main processor may transmit a link training signal to the timing controller via the main link. Accordingly, the main processor and the timing controller are synchronized.

The display timing enters an active period, and the main processor transmits the pixel packet through the main link MAIN LINK (1360).

The end of the flow chart is at (1365).

Accordingly, even when the length of the vertical blank period is not previously stored in the memory every refresh frame rate, the length of the vertical blank period may be detected, and the transmission/reception circuit connected to the auxiliary channel may be powered off.

Accordingly, power consumption of the main processor and the timing controller may be reduced.

The foregoing embodiments of the disclosure are briefly described below.

Embodiments of the disclosure may provide a control circuit 100, comprising a main processor 110 including a source transmission/reception circuit 520, and a timing controller 120 including a sync transmission/reception circuit 530 connected with the main processor 110 through an interface 510 and generating and outputting image data DATA and a control signal DCS or GCS, wherein the interface 510 includes a main link MAIN LINK and an auxiliary channel AUX, and wherein the main processor 110 powers off at least one of the source transmission/reception circuit 520 or the sync transmission/reception circuit 530 electrically connected with the auxiliary channel AUX during at least a partial period of a vertical blank period VBLANK between different refresh frame periods.

Embodiments of the disclosure may provide the control circuit 100, wherein the main processor 110 includes a timing generator 540 generating and outputting a clock signal CLK, and a counter 800 configured to detect a pulse edge of the clock signal CLK.

Embodiments of the disclosure may provide the control circuit 100, wherein the main processor 110 powers on the source transmission/reception circuit 520 electrically connected to the auxiliary channel AUX if a preset or selected number of pulse edges of the clock signal CLK are detected.

Embodiments of the disclosure may provide the control circuit 100, wherein the counter 800 detects either a falling edge or a rising edge of the clock signal CLK.

Embodiments of the disclosure may provide the control circuit 100, wherein the timing controller 120 generates and outputs a horizontal synchronization signal indicating a start of a horizontal line in a frame, and wherein the clock signal CLK output by the timing generator 540 has a same frequency as the horizontal synchronization signal.

Embodiments of the disclosure may provide the control circuit 100, wherein the main processor 110 detects a length of a period when the source transmission/reception circuit 520 electrically connected with the main link MAIN LINK is in a powered-off state, and wherein the main processor 110 controls a length of a period when the source transmission/reception circuit 520 electrically connected with the auxiliary channel AUX is powered off based on the detected length of the period.

Embodiments of the disclosure may provide the control circuit 100, wherein a period when the source transmission/reception circuit 520 electrically connected with the auxiliary channel AUX is powered off is varied depending on a length of the vertical blank period VBLANK.

Embodiments of the disclosure may provide the control circuit 100, wherein the main processor 110 controls to vary a length of a period when the source transmission/reception circuit 520 electrically connected with the auxiliary channel AUX is powered off, depending on a length of the vertical blank period VBLANK.

Embodiments of the disclosure may provide the control circuit 100, wherein the source transmission/reception circuit 520 and the sync transmission/reception circuit 530 electrically connected with the auxiliary channel AUX are connected with a single power source.

Embodiments of the disclosure may provide the control circuit 100, wherein the main processor 110 controls an on/off timing of the single power source.

Embodiments of the disclosure may provide the control circuit 100, wherein the counter 800 includes a flip-flop (e.g., the first flip-flop 810) receiving the clock signal CLK.

Embodiments of the disclosure may provide the control circuit 100, wherein at a time (e.g., time t4) when the main processor 110 transmits, to the timing controller 120, a link training signal LINK TRAINING for synchronization between the main processor 110 and the timing controller 120 through the main link MAIN LINK, a preset or selected level of constant voltage is applied to the auxiliary channel AUX.

Embodiments of the disclosure may provide a display device 300, comprising a main processor 110 including a source transmission/reception circuit 520, a timing controller 120 including a sink transmission/reception circuit 530 connected with the main processor 110 through an interface 510 and generating and outputting image data DATA and a control signal DCS or GCS, a data driving circuit 320 controlled for driving timing by the timing controller 120 and generating and outputting a data voltage based on the image data DATA and the control signal DCS or GCS, a gate driving circuit 330 controlled by the timing controller 120 and outputting a gate voltage based on the control signal DCS or GCS, and a display panel 310 having a plurality of data lines DL to which the data voltage is applied, a plurality of gate lines GL to which the gate voltage is applied, and a plurality of subpixels SP electrically connected to the plurality of data lines DL and the plurality of gate lines GL, wherein the interface 510 includes a main link MAIN LINK and an auxiliary channel AUX, and wherein the main processor 110 powers off at least one of the source transmission/reception circuit 520 or the sync transmission/reception circuit 530 electrically connected with the auxiliary channel AUX during at least a partial period of a vertical blank period VBLANK between different refresh frame periods.

Embodiments of the disclosure may provide the display device 300, wherein the timing controller 120 generates and outputs a vertical synchronization signal including a plurality of frame periods, wherein the main processor 110 transmits a pixel packet PXL PACKET through the main link MAIN LINK to the timing controller 120 during a refresh frame period among the plurality of frame periods, and wherein the main processor 110 powers off at least one of the source transmission/reception circuit 520 or the sync transmission/reception circuit 530 electrically connected with the auxiliary channel AUX during a skip frame period other than the refresh frame period among the plurality of frame periods.

Embodiments of the disclosure may provide a method 1200 or 1300 for driving a main processor 110, comprising transmitting a pixel packet PXL PACKET for generating image data DATA to a timing controller 120 through a main link MAIN LINK of an interface 510, by the main processor 110 (1210 or 1310), powering off a source transmission/reception circuit 520 electrically connected with an auxiliary channel AUX of the interface 510 after the timing controller 120 receives the pixel packet PXL PACKET, by the main processor 110 including the source transmission/reception circuit 520 (1230 or 1345), powering on the source transmission/reception circuit 520 electrically connected with the auxiliary channel AUX, by the main processor 110 (1250 or 1345), and transmitting a link training signal LINK TRAINING through the main link MAIN LINK, by the main processor 110 (1260 or 1355).

Embodiments of the disclosure may provide the method 1200 or 1300 further comprising counting pulses of a clock signal CLK generated and output by the main processor 110, by a counter 800 included in the main processor 110 (1240, 1325, or 1350).

Embodiments of the disclosure may provide the method 1300, wherein counting the pulses of the clock signal CLK by the counter 800 (1240 or 1350) is performed while the source transmission/reception circuit 520 electrically connected with the auxiliary channel AUX is in a powered-off state.

Embodiments of the disclosure may provide the method 1300, wherein counting the pulses of the clock signal CLK by the counter 800 (1325) is performed while the source transmission/reception circuit 520 electrically connected with the auxiliary channel AUX is in a powered-on state.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit, comprising:
   a main processor including a source transmission/reception circuit; and
   a timing controller including a sink transmission/reception circuit connected with the main processor through an interface, the timing controller generating and outputting image data and a control signal,
   wherein the interface includes a main link and an auxiliary channel, and
   wherein, in operation, the main processor powers off at least one of the source transmission/reception circuit and the sink transmission/reception circuit electrically connected with the auxiliary channel during at least a partial period of a vertical blank period between different refresh frame periods, and
   wherein, in operation, the main processor powers off at least one of the source transmission/reception circuit and the sink transmission/reception circuit electrically connected with the auxiliary channel during a skip frame period other than the refresh frame period among the plurality of frame periods.

2. The control circuit of claim 1, wherein the main processor includes:
   a timing generator generating and outputting a clock signal; and
   a counter configured to detect a pulse edge of the clock signal.

3. The control circuit of claim 2, wherein the main processor powers on the source transmission/reception circuit electrically connected to the auxiliary channel when a selected number of pulse edges of the clock signal are detected.

4. The control circuit of claim 2, wherein the counter detects either a falling edge or a rising edge of the clock signal.

5. The control circuit of claim 2, wherein the timing controller generates and outputs a horizontal synchronization signal indicating a start of a horizontal line in a frame, and
   wherein the clock signal output by the timing generator has a same frequency as the horizontal synchronization signal.

6. The control circuit of claim 1, wherein the main processor detects a length of a period when the source transmission/reception circuit electrically connected with the main link is in a powered-off state, and
wherein the main processor controls a length of a period when the source transmission/reception circuit electrically connected with the auxiliary channel is powered off based on the detected length of the period.

7. The control circuit of claim 1, wherein a period in which the source transmission/reception circuit electrically connected with the auxiliary channel is powered off is varied depending on a length of the vertical blank period.

8. The control circuit of claim 1, wherein the main processor controls variation of a length of a period when the source transmission/reception circuit electrically connected with the auxiliary channel is powered off, depending on a length of the vertical blank period.

9. The control circuit of claim 1, wherein the source transmission/reception circuit and the sink transmission/reception circuit electrically connected with the auxiliary channel are connected with a single power source.

10. The control circuit of claim 9, wherein the main processor controls an on/off timing of the single power source.

11. The control circuit of claim 2, wherein the counter includes a flip-flop receiving the clock signal.

12. The control circuit of claim 1, wherein at a time when the main processor transmits, to the timing controller, a link training signal for synchronization between the main processor and the timing controller through the main link, a selected level of constant voltage is applied to the auxiliary channel.

13. A display device, comprising:
a main processor including a source transmission/reception circuit;
a timing controller including a sink transmission/reception circuit connected with the main processor through an interface, the timing controller generating and outputting image data and a control signal;
a data driving circuit controlled for driving timing by the timing controller and generating and outputting a data voltage based on the image data and the control signal;
a gate driving circuit controlled by the timing controller and outputting a gate voltage based on the control signal; and
a display panel having a plurality of data lines to which the data voltage is applied,
a plurality of gate lines to which the gate voltage is applied, and a plurality of subpixels electrically connected to the plurality of data lines and the plurality of gate lines,
wherein the interface includes a main link and an auxiliary channel, and
wherein, in operation, the main processor powers off at least one of the source transmission/reception circuit and the sink transmission/reception circuit electrically connected with the auxiliary channel during at least a partial period of a vertical blank period between different refresh frame periods,
wherein, in operation, the main processor powers off at least one of the source transmission/reception circuit and the sink transmission/reception circuit electrically connected with the auxiliary channel during a skip frame period other than the refresh frame period among the plurality of frame periods.

14. The display device of claim 13, wherein the timing controller generates and outputs a vertical synchronization signal including a plurality of frame periods,
wherein the main processor transmits a pixel packet through the main link to the timing controller during a refresh frame period among the plurality of frame periods.

15. A method for driving a main processor, the method comprising:
transmitting a pixel packet for generating image data to a timing controller through a main link of an interface, by the main processor;
powering off a source transmission/reception circuit electrically connected with an auxiliary channel of the interface after the timing controller receives the pixel packet, by the main processor including the source transmission/reception circuit;
powering on the source transmission/reception circuit electrically connected with the auxiliary channel, by the main processor; and
transmitting a link training signal through the main link, by the main processor,
wherein the method further comprising:
counting pulses of a clock signal generated and output by the main processor, by a counter included in the main processor,
wherein counting the pulses of the clock signal by the counter is performed while the source transmission/reception circuit electrically connected with the auxiliary channel is in a powered-off state.

16. The method of claim 15, wherein counting the pulses of the clock signal by the counter is performed while the source transmission/reception circuit electrically connected with the auxiliary channel is in a powered-on state.

17. A control circuit, comprising:
a main processor including a source transmission/reception circuit; and
a timing controller including a sink transmission/reception circuit connected with the main processor through an interface, the timing controller generating and outputting image data and a control signal,
wherein the interface includes a main link and an auxiliary channel, and
wherein, in operation, the main processor powers off at least one of the source transmission/reception circuit and the sink transmission/reception circuit electrically connected with the main link during at least a partial period of a vertical blank period between different refresh frame periods,
wherein, in operation, a powered off state of the main link is terminated as the main processor transmits an active synchronization signal indicating a start of an active period to the timing controller through the auxiliary channel.

18. The control circuit of claim 17,
wherein the main processor transmits a pixel packet for image display to the timing controller through the main link in the active period.

19. The control circuit of claim 17, wherein the main processor detects a length of a period from a start of the powered off state of the main link until the main processor transmits the active synchronization signal.

20. The control circuit of claim 19, wherein the main processor includes:
a timing generator generating and outputting a clock signal; and a counter configured to count a number of pulse edges of the clock signal from a start of the powered off state of the main link until the main processor transmits the active synchronization signal.

21. The control circuit of claim 19, wherein, during at least a partial period of the vertical blank period, the main processor powers off at least one of the source transmission/reception circuit and the sink transmission/reception circuit electrically connected with the main link, and powers off at least one of the source transmission/reception circuit and the sink transmission/reception circuit electrically connected with the auxiliary channel.

22. The control circuit of claim 21, wherein the main processor controls a length of a period when the main link and the auxiliary channel are in the powered off state based on the length of the period from the start of the powered off state of the main link until the main processor transmits the active synchronization signal.

* * * * *